Aug. 15, 1967 W. D. HAENTJENS 3,335,481
METHOD OF MANUFACTURE OF AN ANNULAR
SPLIT BEARING HOUSING
Filed Dec. 30, 1964
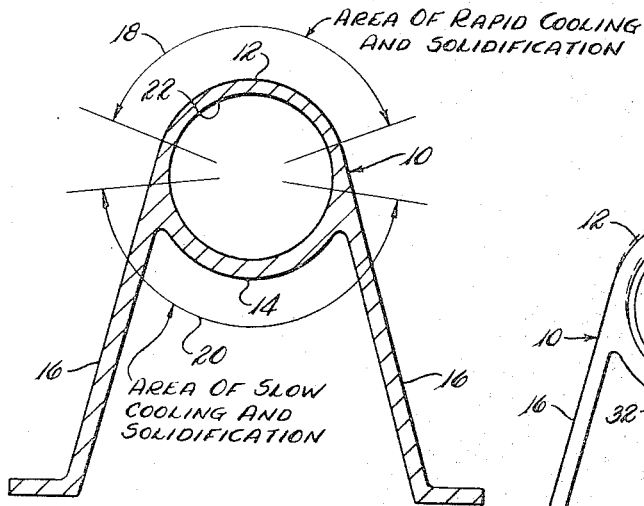
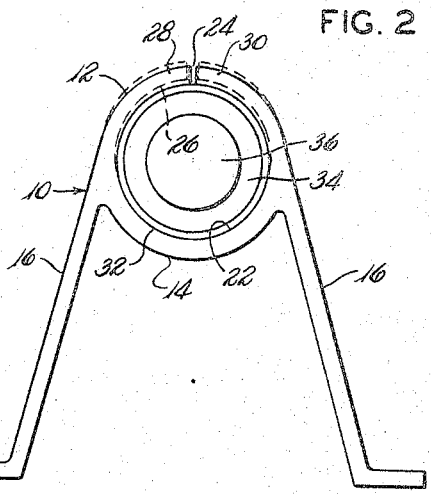
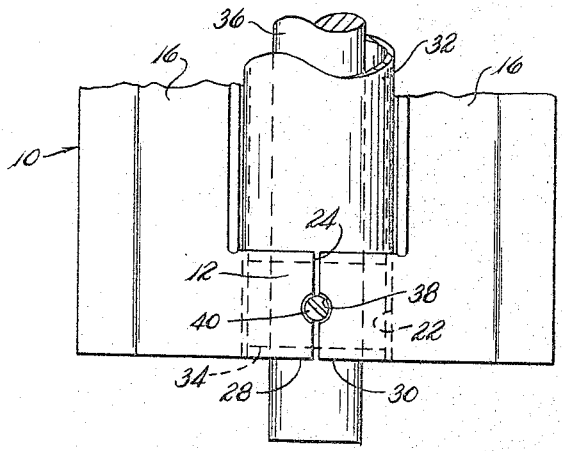
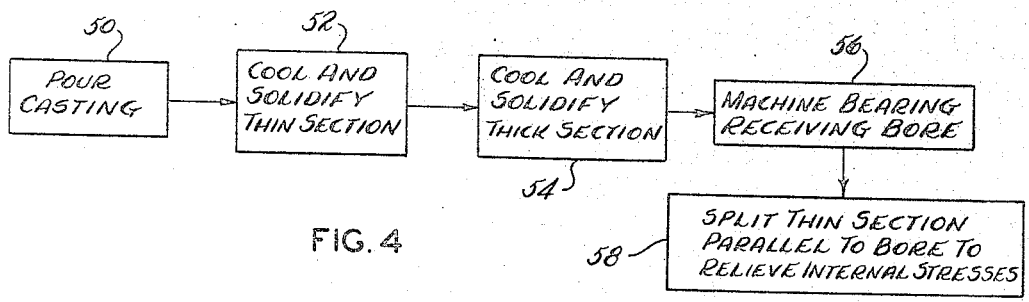
INVENTOR.
WALTER D. HAENTJENS
BY
ATTYS.

United States Patent Office 3,335,481
Patented Aug. 15, 1967

3,335,481
METHOD OF MANUFACTURE OF AN ANNULAR
SPLIT BEARING HOUSING
Walter D. Haentjens, R.D. 1, Sugarloaf, Pa. 18249
Filed Dec. 30, 1964, Ser. No. 422,255
6 Claims. (Cl. 29—149.5)

This invention relates to a method of manufacture for an annular split bearing housing, and more particularly to a method for making a unique bearing housing which is cast in various thickness and cooled unevenly to set up stresses which after boring and splitting of the housing allow it to compress inwardly reducing the size of the bore and clamping securely onto a bearing carried thereby.

Heretofore, it has been known that many types of equipment, such as centrifugal pumps for slurry service, require shafts which can be axially moved. This is frequently accomplished by mounting the shaft bearings in a tube which can be axially adjusted. Most bearing yokes which mount a separate bearing tube or enclosure have either a non-adjustable bore which requires close tolerance machining, or a split yoke which requires clamping means thereon to secure it on the bearing tube. These devices are expensive, difficult to operate, and not readily adjustable. A new and more efficient split yoke type bearing housing is needed by the art.

Therefore, it is the general object of the present invention to avoid and overcome the foregoing and other difficulties of and objections to prior art practices by meeting the needs of the art with a split bearing housing made by casting a housing of different thicknesses at different portions thereof and solidifying the thinner portion first so that as the thicker portion is solidified it sets up internal stresses which draw in and tighten the fit onto a bearing tube when the housing is split after machining the required bore for the tube and the tube is suitably positioned in the housing.

A further object of the invention is to provide a method of manufacture for a split bearing housing which housing produced thereby does not require any external clamping means for a tight grip onto a bearing tube positioned therein, as the housing is cast using controlled casting solidification conditions to set up internal stresses therein, which residual stresses draw the housing in and tighten its fit onto the tube when the housing is made in the manner herein described.

A further object of the invention is to provide a method for manufacturing split bearing housings having internal stresses to draw in and tighten the fit onto a bearing or bearing tube by splitting the housing longitudinally after machining the bore, and by associating removable means with the split housing to expand it for reception of a bearing tube or the like.

Another object of the invention is to provide a method of manufacture for a split bearing housing which bearing housing produced thereby is quite inexpensive, which housing is extremely practical and effective in operation, which allows ready and precise axial adjustment of any bearing mounted thereby, and which securely holds the bearing mounted thereby in the proper position without the use of external clamping means.

The aforesaid objects of the invention and other objects which will become apparent as the description proceeds are achieved by providing a split bearing housing having a cast iron annular shaped casing with a thick section and a thin section so solidified upon casting as to put the thin section in compression, the casting having a bore made therethrough of a desired diameter and a slot through approximately the center of the thin section substantially parallel to the bore, the slot being cut after the bore is formed whereby the compression forces in the thin half of the casing are released and the bore is reduced in diameter when the slot is cut into the housing.

The method of the invention to manufacture an annular split bearing housing includes the steps of casting an annular housing from molten iron so that approximately ½ thereof is of a constant relatively thin cross-section and the other half has a constant relatively thick cross-section, controllably cooling the half with the thin cross-section first and subsequently cooling the half with the thick cross-section so as to create internal compressive stresses in the thin cross-section, boring the housing to a desired diameter, and splitting the housing at about the center of the half with the thin cross-section along a line parallel to the bore through the housing.

For a better understanding of the invention, reference should be had to the accompanying drawings, wherein:

FIGURE 1 is a vertical cross-section of a base supported annular bearing housing formed according to the method of the invention, prior to the splitting thereof;

FIGURE 2 is an end elevation of the annular bearing housing of FIGURE 1 after it is split and clamped around a bearing support tube showing how the internal stresses in the thin section of the housing have been relieved and the housing compresses around the bearing tube;

FIGURE 3 is a broken away fragmentary plan view of the housing of FIGURE 2 showing the tapered hole and plug means, hereinafter described in more detail, utilized for spreading the split in the housing to allow axial positioning of the bearing support tube; and FIGURE 4 is a block diagram showing the method steps sequentially utilized in making the split bearing housing of the invention.

While it should be understood that the bearing housing of the invention and the method of manufacture thereof could be applicable to a bearing housing supporting any type of bearing, it was designed for the purpose of supporting and holding a tube bearing support for mounting the shaft bearings of a horizontal shaft, and hence it has been so illustrated and so described.

With reference to the form of the invention illustrated in FIGURE 1 of the drawings, the numeral 10 indicates generally a bearing housing which comprises a thin section 12 positioned on the vertically upward half and a thicker section 14 on the vertically downward half of the housing 10. The housing 10 is formed with the thin section 12 and thicker section 14, as more fully described hereinafter, so as to set up internal stresses within the thin section 12 to achieve the objects of the invention, as more fully described hereinafter. FIGURE 1 also shows that the housing 10 may be mounted by support legs, or a base pedestal 16. The housing 10 is generally made as a casting from a suitable molten iron composition. No special risers or other means are used to keep the casting liquid in the sections 12 and 14, but the desired solidification action is obtained by use of the thin section 12 being the top portion of the casting and with gating and risering of such a nature as to have the thin section 12 rapidly cool and solidify at least over a portion as generally indicated by the double ended arrow 18. The thicker section 14 is cooled more slowly and solidifies after the upper section 12, which solidification takes place over an extended area indicated by the double ended arrow 20. It is the rapid cooling and solidification of the thin section 12 coupled with the slow cooling and solidification of the thicker section 14 and the following solidification of the base 16 and its portions that connect to the section 14 which set up the desired internal compressive stresses within the thin section 12.

After the housing 10 has been cast and hardened, it is provided with an accurately sized and shaped central bore 22 adapted to receive a bearing and associated shaft (not shown in FIGURE 1). The bore 22 may be cylindrically shaped and of a desired diameter to receive a particular bearing. However, the invention also contemplates that the bore 22 may be concave in shape to receive bearings having particular concave outward surfaces for mating therewith. In other words, the invention contemplates that the bore 22 will be provided with the shape necessary to receive a particular bearing. The machining and forming of the bore 22 is always performed after the casting. Generally, the casting process will not be exact or accurate enough to eliminate necessary machining or further forming of the bore 22, however it may be that further forming will not be necessary.

FIGURE 2 illustrates the bearing housing 10 of FIGURE 1 having the thin walled top section 12 split at 24 along a line substantially parallel with the bore 22. The split 24 extends completely through the section 12 and will be of sufficient width to allow the internal compressive stresses to be relieved by pulling the ends 28 and 30 of the thin section 12 adjacent the split 24 downward and inward from their original position, as more clearly indicated by a dotted line 26. In other words, the internal compressive stresses pull the now cantilevered ends, or arms 28 and 30 of the thin top section 12 downwardly and inwardly to reduce the diameter of the bore 22. FIGURE 2 also shows a bearing tube 32 operatively positioned in the bore 22 and held in position by the downward and inward compressing action of the cantilevered ends 28 and 30 of the thin section 12. The bearing tube 32 may mount bearing 34 therein while a shaft 36 is rotatably mounted by the bearing 34.

It has been found that proper casting and sequential cooling of the housing 10, forming of the bore 22, and splitting the bearing housing at 24 in the thin section 12 provides a considerable compressive force in the cantilevered ends 28 and 30 to draw them onto the bearing tube 32 so that no other clamping of the bearing tube 32 into position relative to the housing 10 is necessary. In order to effect any longitudinal movement of the bearing tube 32 with respect to the housing 10 and to control the size of the bore, a tapered set screw hole 38, as best seen in FIGURE 3, is provided at the split 24. A tapered set screw 40 is received in the hole 38 so that movement of the screw 40 down into the hole 38 will cause the split 24 to be widened sufficiently to allow the tube 32 to be moved longitudinally to the desired position in the bearing housing. The positions of the bearing 34 and the shaft 36 relative to the housing 10 and the base support 16 should also be noted with respect to FIGURE 3.

The block diagram of FIGURE 4 indicates the sequential manufacturing steps for the housing 10. As indicated by block 50, the first step involves pouring of the casing. This is followed, in time sequence, by cooling and solidification of the thin section, as indicated by block 52, and cooling and solidification of the thick section, as indicated by block 54. The solidified housing is then machined appropriately to provide a bearing receiving bore, as indicated by block 56, with the thin section then being split in any conventional manner substantially parallel to the bore at the center thereof to provide cantilevered arms which compress together because of the relieved internal compression stresses to provide a clamping action on the bearing tube, or bearing itself, as indicated by block 58.

It should be realized that the bearing housing is of any suitable construction, and that it may comprise a casting having continuous legs or a support base extending the length thereof. Two annular portions usually are provided in the casting at the ends thereof for engaging the bearing tube 32 at spaced portions thereof. Only one end of the bearing housing 10 is shown in FIGURE 3.

The thin section 12 need not be the upper portion of the bearing housing as operatively positioned and such section may be of suitable length, usually about 150 to 180° in circumferential extent.

Thus, it is seen that the objects of the invention are provided by a novel manufacturing process for an improved cast metal split bearing housing. No stress relief is given to the castings so that certain stresses remain in the metal of the housing.

In practice of the invention, the residual stresses are such in the arms 28 and 30 that it is not unusual for the machined bore to be reduced by as much as .020 inch, for example, measured in the direciton of the perpendicular to the plane of the split. Thus, in order to permit insertion of a bearing tube or bearing into the housing, the cantilevered arm portions must be expanded by inserting the tapered threaded plug or set screw 40 into the tapered opening in the split. When this plug is drawn down, the wedging action of the taper causes the cantilevered arms to open to their original positions, or more open positions, depending upon the turning effect of the tapered plug. Once the bearing tube or bearing is inserted into the housing, and properly positioned axially, the tube or bearing can be clamped in place merely by removing the plug whereby the stresses in the cantilevered arms of the thin section or portion will cause them to compress inwardly on the bearing means.

If axial adjustment of the shaft and bearing assembly, or of the bearing tube, is required at any subsequent time, it is only necessary to reinsert the tapered threaded plug and expand the cantilevered arms enough to permit the tube or bearing to slide through the housing.

While in accordance with the patent statutes only one best known embodiment of the invention is illustrated and described in detail, it is to be particularly understood that the invention is not limited thereto or thereby, but that the inventive scope is defined in the appended claims.

What is claimed is:

1. A method to manufacture an annular split bearing housing which includes the steps of
    casting an annular housing from molten metal so that approximately one-half thereof has a relatively thin cross-section while the other approximate one-half thereof has a relatively thick cross-section,
    cooling the half with the thin cross-section first, then, subsequently cooling the half with the thick cross-section to pull the thin cross-section into compression,
    forming the central bore in the annular housing to a desired diameter, and
    splitting the housing at approximately the center of the half with the thin cross-section along a line parallel to the bore through the housing.

2. A method according to claim 1 and including the steps of forming a tapered tapped hole in the housing perpendicular to the axis of the bore at about the center of the half with the thin cross-section, at the split portion thereof and positioning a tapered set screw in the hole whereby movement of the screw down in the hole causes the split in the housing to widen.

3. A method to manufacture a split bearing housing which include the steps of
    casting a housing having a hole therethrough from molten metal so that approximately the top half thereof has a relatively thin cross-section while approximately the bottom half has a relatively thick cross-section,
    allowing the casting to cool so that the thin top section solidifies first and as the bottom half solidifies it forces the top half into compression,
    forming the bore of the housing to a desired shape, and
    splitting the housing a sufficient thickness at about the center of the thin top half along a line parallel to the bore through the housing to relieve the internal compressive stresses in the thin top half.

4. A method according to claim 3 and including the steps of forming a tapered tapped hole in the housing perpendicular to the axis of the bore at about the center of the top half with the thin cross-section at the split portion thereof, the split in the housing along the line parallel to the bore through the housing also being through the tapered tapped hole.

5. A method to manufacture a bearing housing which includes
    casting a molten metal into an annular ring with a thick half of the circumference downwardly and a thin half of the circumference upwardly,
    allowing the metal to cool naturally so that the thin half of the circumference solidifies first with subsequent solidification of the thick half of the circumference to force the thin half of the circumference into compression, and
    splitting the thin half of the circumference at about the center thereof parallel to the bore and of sufficient width to relieve all compressive forces therein so the arms formed thereby compress inwardly onto the bore.

6. A method to manufacture a bearing housing which includes the steps of
    casting molten metal into an annular member having a relatively thick section and a relatively thin section in the circumference thereof, the thick section comprising about the lower half of such member and the thin section also comprising about one-half of such member and being the upper portion thereof as cast,
    cooling the metal so that the thin section of the circumference solidifies first with subsequent solidification of the thick section of the circumference to force the thin section of the circumference into compression, and
    splitting the thin section of the circumference at about the center thereof parallel to the bore of said member without relieving the stresses in said member, said split being of sufficient width to relieve all forces in said thin section by the arms formed therein compressing inwardly of the bore.

References Cited

UNITED STATES PATENTS

| | | | |
|---|---|---|---|
| 1,964,770 | 7/1934 | Runge | 29—149.5 X |
| 2,560,413 | 7/1951 | Carlson | 29—149.5 X |

JOHN F. CAMPBELL, *Primary Examiner.*

THOMAS H. EAGER, *Examiner.*